(12) United States Patent
Chang et al.

(10) Patent No.: US 9,409,693 B2
(45) Date of Patent: Aug. 9, 2016

(54) CARTON

(71) Applicant: AU Optronics Corporation, Hsin-Chu (TW)

(72) Inventors: Li-Wei Chang, Hsin-Chu (TW); Pei-Lun Chien, Hsin-Chu (TW); Hsin-Le Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/265,818

(22) Filed: Apr. 30, 2014

(65) Prior Publication Data

US 2014/0326621 A1    Nov. 6, 2014

(30) Foreign Application Priority Data

May 3, 2013 (CN) .......................... 2013 1 0160645

(51) Int. Cl.
*B65D 81/26*   (2006.01)
*B01J 20/28*   (2006.01)

(52) U.S. Cl.
CPC ............ *B65D 81/264* (2013.01); *B65D 81/268* (2013.01); *B01J 20/2805* (2013.01); *B65D 81/26* (2013.01)

(58) Field of Classification Search
USPC ................... 206/204, 484, 486, 213.1, 205; 422/305, 306; 96/147, 148; 428/178; 239/57, 51.5; 55/507, 513, 518
See application file for complete search history.

(56) References Cited

U.S. PATENT DOCUMENTS

| | | | | |
|---|---|---|---|---|
| 1,032,319 A * | 7/1912 | Anthony | ................ | G07D 9/004 206/0.83 |
| 2,452,957 A * | 11/1948 | Sabin | ...................... | A24F 15/18 239/34 |
| 2,524,162 A * | 10/1950 | Chavannes | ............ | A23L 3/3418 206/204 |
| 2,789,369 A * | 4/1957 | Walker | ................. | B65D 81/268 34/80 |
| 2,994,404 A * | 8/1961 | Schifferly | .................... | 96/117.5 |
| 3,464,540 A * | 9/1969 | Stark | ............................. | 206/524 |

(Continued)

FOREIGN PATENT DOCUMENTS

| | | |
|---|---|---|
| CN | 201647380 | 11/2010 |
| CN | 102991811 A | 3/2013 |

(Continued)

*Primary Examiner* — J. Gregory Pickett
*Assistant Examiner* — Gideon Weinerth
(74) *Attorney, Agent, or Firm* — WPAT, PC; Justin King; Jonathan Chiang

(57) ABSTRACT

A moisture-absorbable carton includes a carton housing, a plurality of cushions disposed in the carton housing, and at least one moisture-absorbable spacer disposed in the carton housing. The moisture-absorbable spacer and a part of the cushions surround an inner surface of the carton housing for forming an accommodation space, wherein the accommodation space is for stowing at least one protected object. The moisture-absorbable spacer comprises a paper casing and at least one drier bag disposed in the paper casing.

14 Claims, 5 Drawing Sheets

(56) References Cited

U.S. PATENT DOCUMENTS

| | | | | |
|---|---|---|---|---|
| 4,036,360 | A * | 7/1977 | Deffeyes | 206/204 |
| 4,401,447 | A * | 8/1983 | Huber | B01D 53/0415 |
| | | | | 210/282 |
| 4,576,841 | A * | 3/1986 | Lingemann | 428/34 |
| 4,709,817 | A * | 12/1987 | Keady | B65D 81/107 |
| | | | | 206/521 |
| 4,749,392 | A * | 6/1988 | Aoki | A47C 27/005 |
| | | | | 55/513 |
| 4,813,791 | A * | 3/1989 | Cullen | B65D 81/268 |
| | | | | 206/204 |
| 4,851,286 | A * | 7/1989 | Maurice | B32B 5/32 |
| | | | | 206/523 |
| 4,861,632 | A * | 8/1989 | Caggiano | 428/35.2 |
| 4,869,369 | A * | 9/1989 | Turngren | B29C 44/30 |
| | | | | 206/453 |
| 4,880,119 | A * | 11/1989 | Simon | B65D 81/09 |
| | | | | 206/584 |
| 4,973,448 | A * | 11/1990 | Carlson et al. | 422/9 |
| 5,000,996 | A * | 3/1991 | Lingemann | 428/72 |
| 5,160,025 | A * | 11/1992 | Greenawald | 206/703 |
| 5,228,567 | A * | 7/1993 | Itoh | B65D 81/24 |
| | | | | 206/204 |
| 5,295,580 | A * | 3/1994 | Hicks | B65D 5/5054 |
| | | | | 206/588 |
| 5,441,170 | A * | 8/1995 | Bane, III | B65D 5/48024 |
| | | | | 206/523 |
| 6,270,609 | B1 * | 8/2001 | Markell | B01D 53/0407 |
| | | | | 156/218 |
| 6,767,521 | B1 * | 7/2004 | Vogt et al. | 422/306 |
| 7,005,035 | B2 * | 2/2006 | O'Neill et al. | 162/114 |
| 7,383,953 | B2 * | 6/2008 | Dickinson | B65D 5/4233 |
| | | | | 206/522 |
| 7,699,913 | B2 * | 4/2010 | Grieve | A43B 17/102 |
| | | | | 252/194 |
| D694,000 | S * | 11/2013 | Walter | D3/204 |
| 2003/0126839 | A1 | 7/2003 | Hoogland | |
| 2005/0098450 | A1 * | 5/2005 | Liu | B65D 81/268 |
| | | | | 206/204 |
| 2005/0155879 | A1 | 7/2005 | Hoogland | |
| 2006/0272960 | A1 * | 12/2006 | McLaughlin | B65B 27/125 |
| | | | | 206/204 |
| 2008/0047850 | A1 * | 2/2008 | Galman | B65D 81/268 |
| | | | | 206/204 |
| 2008/0290145 | A1 * | 11/2008 | Makofsky | B65D 7/26 |
| | | | | 229/68.1 |
| 2011/0048976 | A1 * | 3/2011 | Dick et al. | 206/204 |
| 2011/0114513 | A1 * | 5/2011 | Miller | 206/204 |
| 2011/0180621 | A1 * | 7/2011 | Gruenbacher | A61L 9/127 |
| | | | | 239/34 |
| 2013/0098783 | A1 * | 4/2013 | Hernandez | F26B 21/083 |
| | | | | 206/204 |
| 2013/0153445 | A1 * | 6/2013 | Cullison | B65D 75/42 |
| | | | | 206/204 |
| 2014/0008261 | A1 * | 1/2014 | Yiu | B65D 75/12 |
| | | | | 206/484 |
| 2014/0060332 | A1 * | 3/2014 | Hsu | F24F 3/1411 |
| | | | | 96/117.5 |
| 2015/0150286 | A1 * | 6/2015 | Milligan | D04H 1/488 |
| | | | | 428/40.1 |
| 2015/0239637 | A1 * | 8/2015 | Kranz | B65D 77/04 |
| | | | | 206/204 |
| 2016/0090668 | A1 * | 3/2016 | Davidson | A47G 27/0206 |
| | | | | 428/41.8 |

FOREIGN PATENT DOCUMENTS

| | | |
|---|---|---|
| DE | 8907342 | 8/1989 |
| TW | M243447 | 9/2004 |
| TW | I225458 | 12/2004 |
| TW | 200621594 | 7/2006 |
| TW | M338224 | 8/2008 |
| TW | M414135 U | 10/2011 |

* cited by examiner

CARTON

RELATED APPLICATIONS

This application claims priority to Chinese Application Serial Number 201310160645.7, filed May 3, 2013, which is herein incorporated by reference.

BACKGROUND

1. Field of Invention

The present invention relates to a carton. More particularly, the present invention relates to a carton with moisture-absorbent for packaging solar cells.

2. Description of Related Art

For these fragile high-technology electronic devices, they are prone to damage under environment, such as water, dust, and/or impact force. Therefore, it becomes critical for the ability of a durable package. In order to reduce the damage happened during delivery, the package needs properties, such as waterproof, anti-dust, and/or anti-shock, serving protective purposes. A common method for preventing objects in the package from impacts during delivery is to provide an additional layer of paper or plastic linings, plastic filling foams, or bubble-like cushions.

Cartons are widely used as package structures. However, cartons would absorb moisture if exposed in the air for a period of time, and the products in the carton may be damaged because of the invading moisture or strength reduction of the wet cartons. Thus there is a need to give a moisture-proof treatment to the cartons for preventing the carton being damaged due to the moisture.

The conventional moisture-proof treatments to the carton include coating a water-proof layer over the cartons, or wrapping a plastic film onto the cartons. However, the water-proof layer may be scraped during transportation, and the process of wrapping the plastic film onto the carton may damage the structure of corrugated board of the carton. Both of the moisture-proof treatments increase additional manufacture cost.

Yet another moisture-proof treatment is to vacuum the cartons. This moisture-proof treatment also incurs extra costs and needs an additional packaging process. Furthermore, if the moisture were already absorbed by the cartons, the moisture would be sealed within the cartons.

SUMMARY

An aspect of the present invention provides a moisture-absorbable carton, which includes a carton, a plurality of cushions disposed in the carton, and at least one moisture-absorbable spacer disposed in the carton. The moisture-absorbable spacer and a part of the cushions surround an inner surface of the carton for forming an accommodation space, wherein the accommodation space is for stowing at least one protected object. The moisture-absorbable spacer comprises paper casing. The paper casing comprises two covers and a buffer component disposed between the two covers, wherein at least one containing slot is formed by the buffer component and the two covers. The drier bag is disposed in the containing slot.

In one or more embodiments of the invention, the paper casing comprises two covers and a connecting portion connecting the covers, and the drier bag is disposed between the covers.

In one or more embodiments of the invention, the paper casing optionally comprises a supporting portion connecting to the covers and the connecting portion.

In one or more embodiments of the invention, the paper casing optionally comprises a plurality of vents disposed at the covers.

In one or more embodiments of the invention, the moisture-absorbable spacer optionally comprises a buffer component disposed between the covers.

In one or more embodiments of the invention, the moisture-absorbable spacer can be disposed between the cushions and touches the inner surface of the carton.

In one or more embodiments of the invention, the moisture-absorbable spacer can be disposed at middle of the carton, and an inner space of the carton housing is divided for forming two accommodation spaces.

In one or more embodiments of the invention, the moisture-absorbable spacer and another part of the cushions can be disposed in the middle of the carton, and an inner space of the carton housing is divided for forming two accommodation spaces.

In one or more embodiments of the invention, the moisture-absorbable spacer can be disposed at top or bottom of the carton.

In one or more embodiments of the invention, the material of the paper casing is corrugated paper.

Another aspect of the invention provides a moisture-absorbable spacer, which includes a paper casing and at least one drier bag. The paper casing comprises two covers and a buffer component disposed between the two covers, wherein at least one containing slot is formed by the buffer component and the two covers. The drier bag is disposed in the containing slot.

In one or more embodiments of the invention, the paper casing optionally comprises a connecting portion the covers, and the drier bag is disposed between the covers.

In one or more embodiments of the invention, the paper casing optionally comprises a supporting portion connecting to the covers and the connecting portion.

In one or more embodiments of the invention, the moisture-absorbable spacer optionally comprises a buffer component disposed between the covers, in which the buffer component comprises at least one cavity for containing the drier bag.

The moisture-absorbable spacers are assemblies. The drier bag can be secured by the paper casing and can be easily changed, so that the moisture-absorbable spacers can be used repeatable. Furthermore, when there is an external force applied to the moisture-absorbable carton, the moisture-absorbable spacers can be squeezed and deformed because of having the desiccants within. Thus the moisture-absorbable spacers not only provide the moisture-absorbing function, but also provide buffer function. Comparing with conventional process for making moisture-proof cartons, the moisture-absorbable spacers are detachably disposed in the carton. The moisture-absorbable spacers can be assembled quickly and elastically. The moisture-absorbable spacers provide moisture-absorbing function for protecting products, such as solar cells, in the carton.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
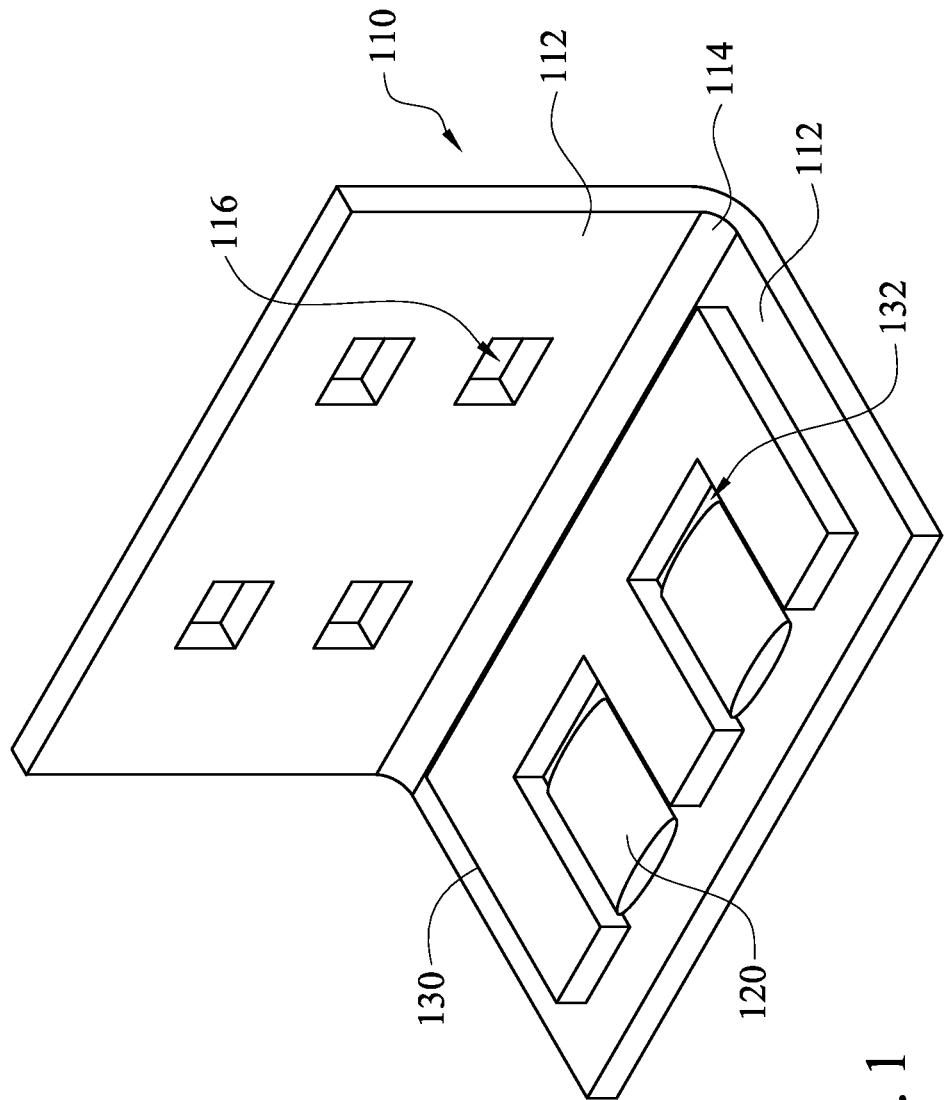
FIG. 1 is a schematic diagram of an embodiment of the moisture-absorbable spacer of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of an embodiment of the moisture-absorbable spacer of the invention. The moisture-absorbable spacer 100 is utilized in the field of package structure, especially in the field of carton, for providing moisture-absorbable and buffer effects. The moisture-absorbable spacer 100 includes a paper casing 110 and drier bags 120. The paper casing 110 includes two covers 112 and a connecting portion 114 for connecting the covers 112. The drier bags 120 are disposed between the covers 112. Namely, the paper casing 110 is a structure similar to a book cover, and the drier bags 120 are placed in the paper casing 110. The material of the paper casing 110 can be a corrugated paper.

The drier bag 120 includes an air permeable wrapping and desiccants contained in the air permeable wrapping. The desiccants can be but not limited to calcium chloride, calcium oxide, phosphoric anhydride, silicone, polymer, or sugar cane fiber.

The moisture-absorbable spacer 100 is pluggable, replaceable, detachable assembled in a moisture-absorbable carton. The desiccants in the moisture-absorbable spacer 100 not only provide moisture-absorbent function, but also provide buffer function.

The moisture-absorbable spacer 100 may optionally include a buffer component 130. The material of the buffer component 130 can be but not limited to EPE, EPS, EVA, or foam. The buffer component 130 can be fastened in the paper casing 110 with adhesive. The buffer component 130 can be an E-shaped or U-shaped structure. The buffer component 130 and the two covers 112 form at least one containing slot 132. The drier bag is disposed in the containing slot 132. Thus the buffer component 130 can be used to fasten the drier bag 120s and provide buffer function.

The paper casing 110 may optionally has a plurality of vents 116. The vents 116 are disposed on the covers 112 corresponding to the drier bags 120. The vents 116 may increase the reaction area between the drier bag 120 and the air thereby improving moisture-absorbing efficiency of the moisture-absorbable spacer 100.

Figure 2:
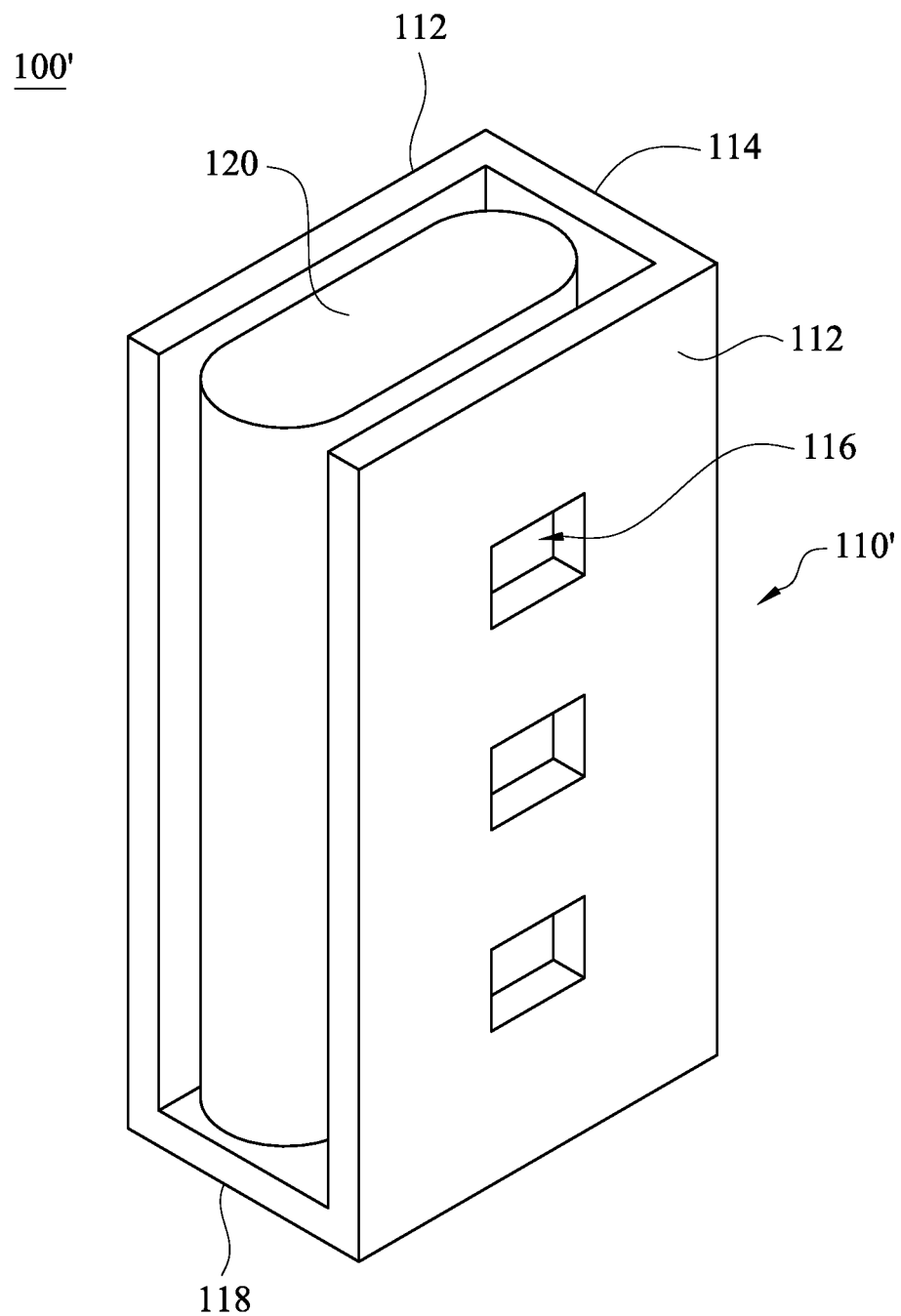
FIG. 2 is a schematic diagram of another embodiment of the moisture-absorbable spacer of the invention.

FIG. 2 is a schematic diagram of another embodiment of the moisture-absorbable spacer of the invention. The moisture-absorbable spacer 100' includes a paper casing 110' and a drier bag 120. The paper casing 110' in this embodiment includes two covers 112, a connecting portion 114 for connecting the covers 112, and a supporting portion 118. The supporting portion 118 connects to the covers 112 and the connecting portion 114. Thus the drier bag 120 can be secured in the paper casing 110' and the problem of drier bag 120 falling out the paper casing due to gravity can be prevented when assembling.

The paper casing 110' can be a one-pieced form structure. The paper casing 110' can be made by cutting corrugated board into a predetermined shape, and the corrugated board is folded to get the paper casing 110' having the covers 112, the connecting portion 114 and the supporting portion 118. The paper casing 110' may have a plurality of vents 116 for increasing the reaction area between the drier bag 120 and the air.

Detail utilizations of the moisture-absorbable spacer 100 (100') are disclosed in the following embodiments.

Figure 3:
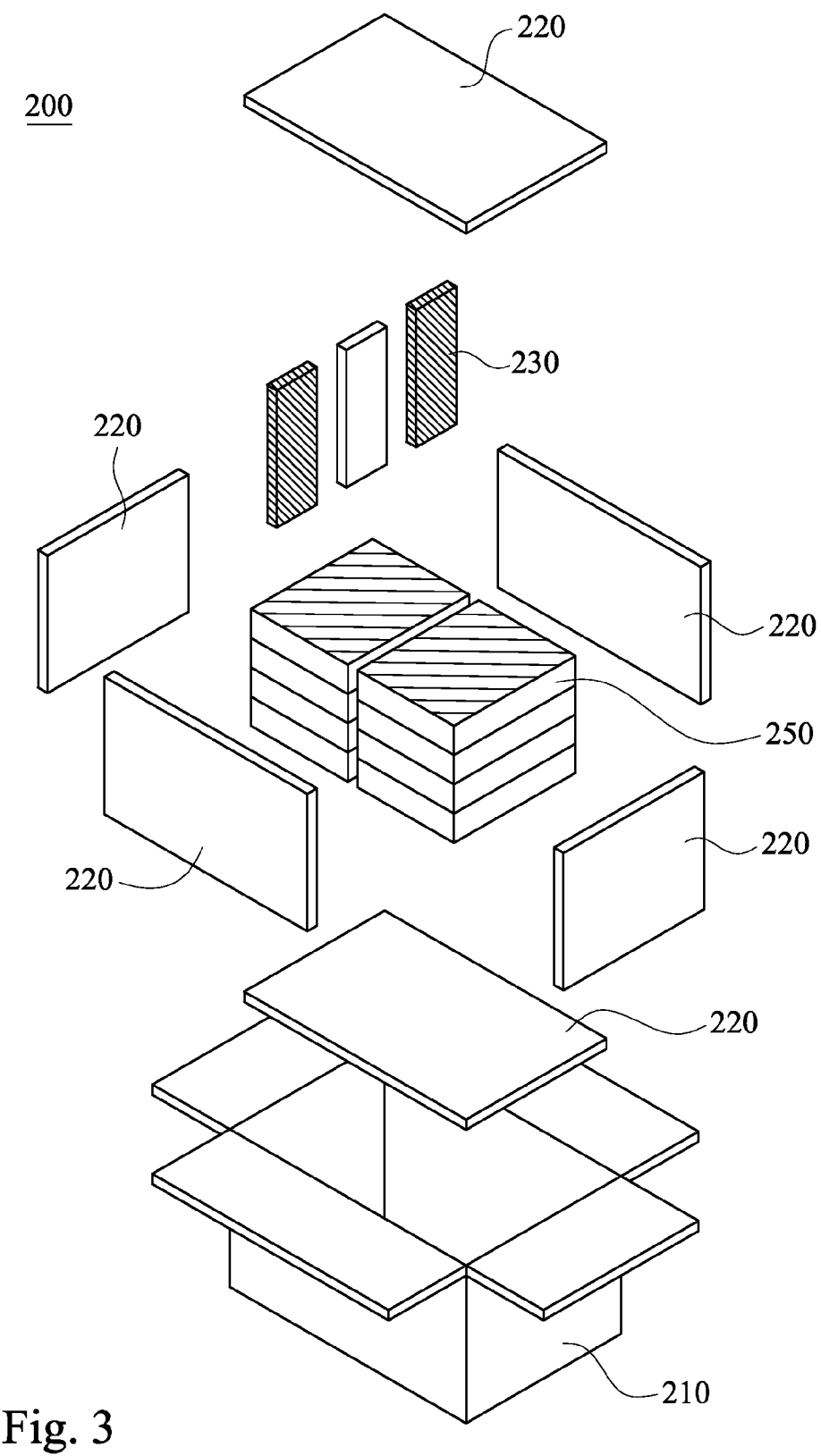
FIG. 3 is an explosion view of an embodiment of a moisture-absorbable carton of the invention.
Figure 4:
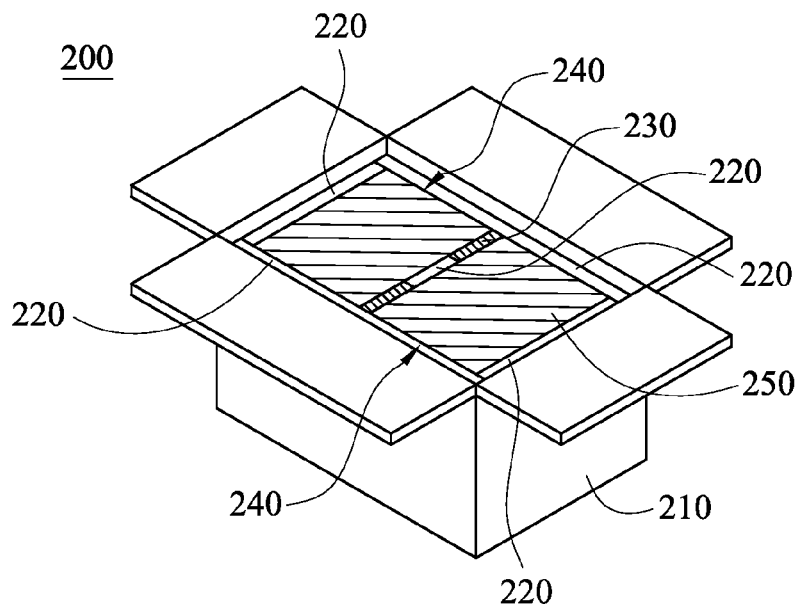
FIG. 4 to FIG. 7 are perspective views of different embodiments of the moisture-absorbable carton of the invention.

Reference is made to both FIG. 3 and FIG. 4. FIG. 3 is an explosion view of an embodiment of a moisture-absorbable carton of the invention. FIG. 4 is a perspective view of an embodiment of the moisture-absorbable carton after assembled. The moisture-absorbable carton 200 includes a carton housing 210, a plurality of cushions 220, and at least one moisture-absorbable spacer 230. The carton housing 210 is utilized for containing protected objects with rectangular block shape, such as products in solar cell package boxes 250, for example. Each of the solar cell package boxes 250 includes a package box and a plurality of solar cell sheets. The solar cell package boxes 250 are placed within the carton housing 210. The cushions 220 are disposed between the solar cell package boxes 250 and the carton housing 210 for protecting the solar cell package boxes 250. For example, the cushions 220 can be disposed at the bottom of the carton housing 210, at the top of the carton housing 210, or be placed against four sidewalls of the carton housing 210. The material of the carton housing 210 can be a corrugated board or a moisture-proof corrugated board.

The moisture-absorbable spacers 230 are disposed in the carton housing 210. The moisture-absorbable spacers 230 can provide buffer and moisture-absorbing functions. In this embodiment, a part of the cushions 220 surround the inner surface of the carton housing 210, and another part of the cushions 220 and the moisture-absorbable spacers 230 are disposed at middle of the carton housing 210 for dividing an inner space of the carton housing 210 into two accommodation spaces 240. The solar cell package boxes 250 are stowed in the accommodation spaces 240.

The cushion 220 can be made of foam. The cushions 220 can be sheet structure of block structure. Detail features of the moisture-absorbable spacers 230 are shown to FIG. 1 or FIG. 2.

Figure 5:
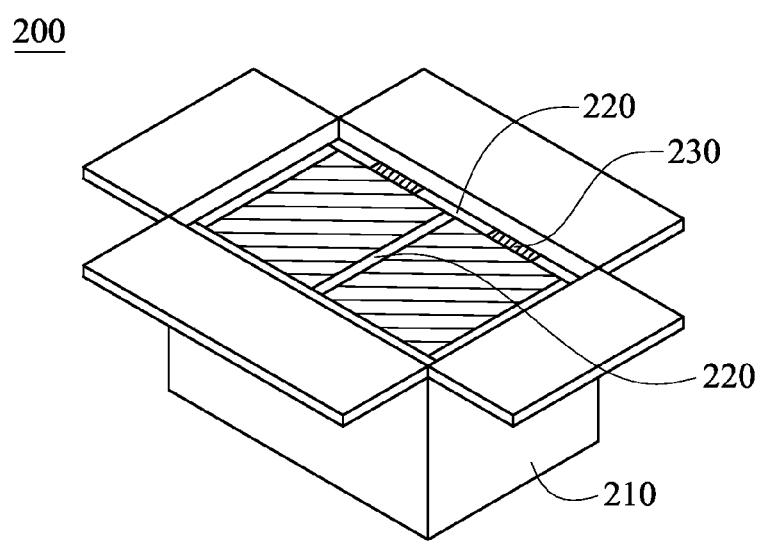
Figure 6:
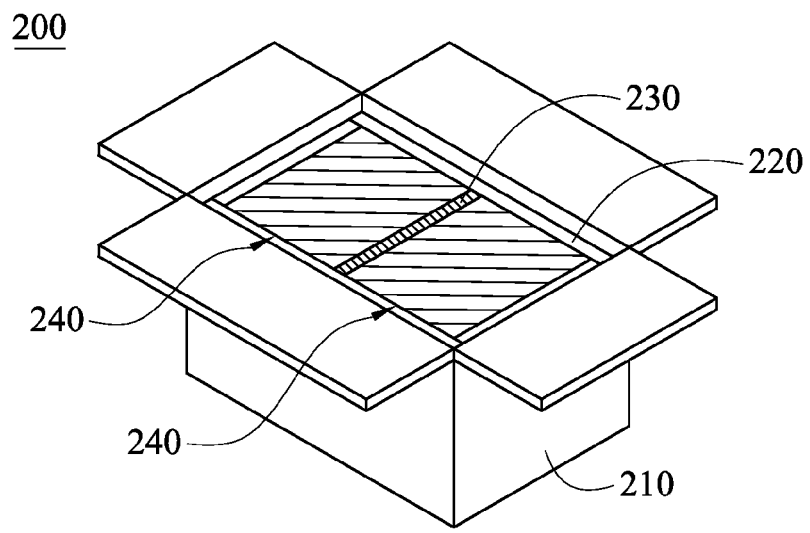
Figure 7:
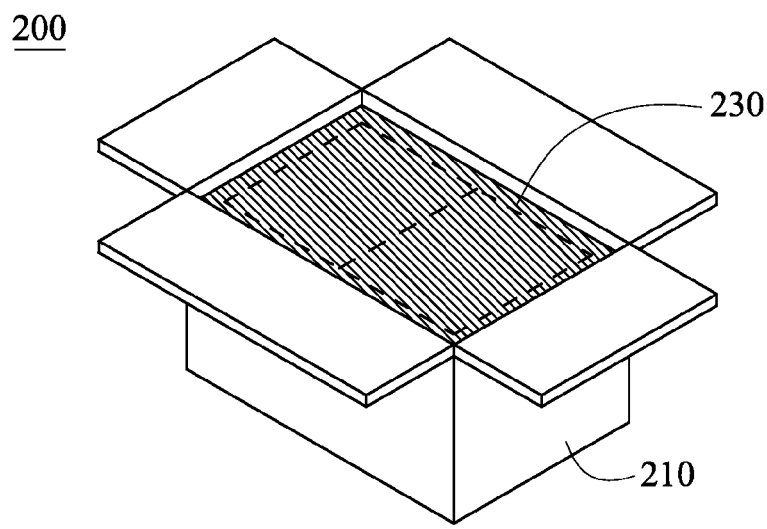

The position and the number of the moisture-absorbable spacers 230 can be adjusted according different design requirements. FIG. 5 to FIG. 7 are perspective diagrams of different embodiments of the moisture-absorbable carton of the invention. The main distinguish between the embodiments in FIGS. 5-7 to FIG. 4 is the placement of the moisture-absorbable spacers 230.

As shown in FIG. 5, the position of a part of the cushions 220 can be replaced by the moisture-absorbable spacers 230, so that the cushions 220 and the moisture-absorbable spacers 230 would surround and against the inner surface of the carton housing 210. The middle of the carton housing 210 may be disposed with only cushions 220, or the combination of cushion(s) 220 and moisture-absorbable spacers 230 as shown in FIG. 4.

As shown in FIG. 6, the cushions 220 only surround the inner surface of the carton housing 210, and the middle of the carton housing 210 is disposed with one or more moisture-absorbable spacer 230 thereby dividing an inner space of the carton housing 210 into two accommodation spaces 240.

As shown in FIG. 7, the moisture-absorbable spacers 230 can be disposed at bottom or top of the carton housing 210. The cushions 220 and/or the moisture-absorbable spacers 230 can be disposed in the middle or surrounding the inner surface of the carton housing 210 for buffering and moisture absorbing.

According to above embodiments, the moisture-absorbable spacers are assemblies. The drier bag can be secured by the paper casing and can be easily changed, so that the moisture-absorbable spacers can be used repeatable. Furthermore, when there is an external force applied to the moisture-absorbable carton, the moisture-absorbable spacers can be squeezed and deformed because the desiccants is in the shape of small particles which can move relatively. Thus the moisture-absorbable spacers not only provide the moisture-absorbing function, but also provide buffer function. Comparing with conventional process for making moisture-proof cartons, the moisture-absorbable spacers are detachably disposed in the carton. The moisture-absorbable spacers can be assembled quickly and elastically. The moisture-absorbable spacers provide moisture-absorbing function for protecting products, such as solar cells, in the carton.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A moisture-absorbable carton comprising:
    a carton housing;
    a plurality of cushions disposed in the carton housing; and
    at least one moisture-absorbable spacer disposed in the carton housing, the moisture-absorbable spacer and a part of the cushions surround an inner surface of the carton housing for forming an accommodation space, wherein the accommodation space is for stowing at least one protected object,
    wherein the moisture-absorbable spacer comprises:
        a paper casing comprising two covers;
        a buffer component disposed between the two covers, wherein at least one containing slot is formed by the buffer component and the two covers, wherein the containing slot comprises a lateral opening defined between the covers of the paper casing; and
        at least one drier bag disposed in the containing slot, wherein the buffer component surrounds the drier bag on three sides for securing the drier bag, and a part of the drier bag is exposed from a lateral side of the lateral opening.

2. The carton of claim 1, wherein the paper casing comprises a connecting portion connecting the covers.

3. The carton of claim 2, wherein the paper casing further comprises a supporting portion connecting to the covers and the connecting portion.

4. The carton of claim 1, wherein the paper casing has a plurality of vents disposed at the covers.

5. The carton of claim 1, wherein the moisture-absorbable spacer is disposed between the cushions and touches the inner surface of the carton housing.

6. The carton of claim 1, wherein the moisture-absorbable spacer is disposed at middle of the carton housing, whereby an inner space of the carton housing is divided for forming two accommodation spaces.

7. The carton of claim 1, wherein the moisture-absorbable spacer and another part of the cushions are disposed in the middle of the carton housing, whereby an inner space of the carton housing is divided for forming two accommodation spaces.

8. The carton of claim 1, wherein the moisture-absorbable spacer is disposed at top or bottom of the carton housing.

9. The carton of claim 1, wherein a material of the paper casing is corrugated paper.

10. The carton of claim 1, wherein the buffer component is E-shaped or U-shaped.

11. A moisture-absorbable carton comprising:
    a carton housing;
    a plurality of cushions disposed in the carton housing; and
    at least one moisture-absorbable spacer disposed in the carton housing, the moisture-absorbable spacer and a part of the cushions surround an inner surface of the carton housing for forming an accommodation space, wherein the accommodation space is for stowing at least one protected object,
    wherein the moisture-absorbable spacer comprises:
        a paper casing comprising two covers;
        a buffer component disposed between the two covers, wherein at least one containing slot is formed by the buffer component and the two covers, wherein the containing slot comprises an opening formed on a lateral side between the covers of the paper casing; and
        at least one drier bag disposed in the containing slot, wherein the buffer component surrounds the drier bag on three sides for securing the drier bag, and a part of the drier bag is exposed from the opening.

12. The carton of claim 11, wherein the paper casing further comprises a connecting portion connecting the covers, and the opening is facing away from the connecting portion.

13. The carton of claim 12, wherein the paper casing further comprises a supporting portion connecting to the covers and the connecting portion.

14. The carton of claim 11, wherein the buffer component is E-shaped or U-shaped.

* * * * *